(12) United States Patent
Chen

(10) Patent No.: US 8,714,802 B2
(45) Date of Patent: May 6, 2014

(54) DISPLAY DEVICE AND INPUT DEVICE WITH MULTI PATTERN LAYERS

(75) Inventor: Chung-Yuan Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 120 days.

(21) Appl. No.: 13/401,538

(22) Filed: Feb. 21, 2012

(65) Prior Publication Data

US 2013/0176749 A1    Jul. 11, 2013

(30) Foreign Application Priority Data

Jan. 6, 2012 (TW) .............................. 101100619 A

(51) Int. Cl.
*G03B 15/02* (2006.01)
*F01P 11/16* (2006.01)
*G01D 11/28* (2006.01)

(52) U.S. Cl.
USPC ........... 362/612; 362/606; 362/607; 362/615; 362/616; 362/625; 362/626

(58) Field of Classification Search
USPC ............. 362/29–30, 606–607, 612, 615–616, 362/625, 626, 630, 631, 613; 345/176, 4, 345/169
See application file for complete search history.

(56) References Cited

U.S. PATENT DOCUMENTS

| | | | | |
|---|---|---|---|---|
| 6,648,486 B2* | 11/2003 | Harbers et al. | ................ | 362/613 |
| 6,871,975 B2* | 3/2005 | Chuang | ........................... | 362/27 |
| 7,034,232 B2* | 4/2006 | Ide et al. | ........................ | 200/5 A |
| 7,154,570 B2* | 12/2006 | Lee | ................................. | 349/58 |
| 7,534,026 B2* | 5/2009 | Uehara et al. | ................. | 362/613 |
| 7,705,257 B2* | 4/2010 | Arione et al. | .................. | 200/314 |
| 7,923,654 B2* | 4/2011 | Zeijlon et al. | ................. | 200/600 |
| 2002/0163791 A1* | 11/2002 | Hoelen et al. | ................... | 362/31 |
| 2003/0063456 A1* | 4/2003 | Katahira | ........................ | 362/27 |
| 2005/0057437 A1* | 3/2005 | Sato | ................................... | 345/4 |
| 2006/0256579 A1* | 11/2006 | Yang et al. | ..................... | 362/613 |
| 2007/0147088 A1* | 6/2007 | Chien et al. | .................... | 362/616 |
| 2008/0062116 A1* | 3/2008 | Morbieu et al. | ............... | 345/102 |
| 2009/0091906 A1* | 4/2009 | Arione et al. | .................. | 361/781 |
| 2009/0294266 A1* | 12/2009 | Ahlgren et al. | ............... | 200/314 |
| 2011/0211365 A1* | 9/2011 | Park | .............................. | 362/606 |

* cited by examiner

*Primary Examiner* — Peggy Neils
*Assistant Examiner* — Erin Kryukova
(74) *Attorney, Agent, or Firm* — Kirton McConkie; Evan R. Witt

(57) ABSTRACT

The present invention discloses an input device with multi pattern layers including an input interface, a first light emitting element for generating a first light beam, a first light guiding plate, a second light emitting element for generating a second light beam, a second light guiding plate, a first circuit board and a second circuit board. The input interface is stacked on the first light guiding plate, and the first light guiding plate is stacked on the second light guiding plate, such that a first space and a second are formed individually at the two ends of the first light guiding plate and the second light guiding plate. The first circuit board and the second circuit board block the first light beam and the second light beam individually by inserting into the first space and the second space individually.

14 Claims, 5 Drawing Sheets

DISPLAY DEVICE AND INPUT DEVICE WITH MULTI PATTERN LAYERS

FIELD OF THE INVENTION

The present invention generally relates to a display device and an input device, and more particularly to a display device capable of displaying different patterns and an input device with two input modes.

BACKGROUND OF THE INVENTION

In general, the display device includes at least a light emitting element and at least a light guiding plate, while there are a plurality of luminous patterns disposed on the light guiding plate. When the light emitting element generates a light beam and the light beam is projected into the light guiding plate to pass through the plurality of luminous patterns, the plurality of luminous patterns are displayed on the light guiding plate. Furthermore, once the display device is assembled with a touch input interface, a touch input device is formed.

Applications of the touch input device is quite extensive. Currently, some of the touch input device which is commercially available has two kinds of different input modes simultaneously. Herein, the touch input device has a luminous module, and a first input mode is provided when the luminous module is turned on and thus the touch input device shows a predetermined pattern, while a second input mode is provided when the luminous module is turned off and thus the predetermined pattern is not shown. In another word, a user may recognize which input mode it is switched to currently by whether the pattern is shown or not, and then input signals according to the current input mode. For example, when the luminous module is turned off, an appearance of the touch input device is presented as a whole black state and the input mode is preset as a mode for controlling a mouse cursor. At this time, the user can implement motions of moving the mouse cursor and clicking according to the appearance of the touch input device is presented as the whole black state. On the contrary, when the luminous is turned on, a luminous keyboard is presented on the touch input device and the input mode is preset as another mode for controlling a keyboard. At this time, the user can input letters and symbols by the touch input device according to the presented luminous keyboard pattern. Therefore, one of the design points of such a luminous touch input device is how to ensure that the pattern is not shown when the luminous module is turned off, but the luminous pattern is shown only when the luminous module is turned on, so as to avoid confusing the user.

FIG. 1 illustrates a structural schematic side view of a conventional luminous input device. Referring to FIG. 1, the conventional luminous input device 1 comprises an input interface 11, a luminous module 12 and a Mylar® polyester plate 13, wherein a bottom-up arranging sequence thereof is the input interface 11, the luminous module 12 and the Mylar® polyester plate 13. The input interface 11 is capable of generating a corresponding signal by being activated by the user with a finger or a stylus. Furthermore, the luminous module 12 comprises a plurality of light emitting elements 121 and a light guiding plate 122, wherein the plurality of light emitting elements 121 are capable of generating at least a light beam (not shown), and the light guiding plate 122 is arranged among the light emitting elements 121 and capable of guiding the light beam, so as to project the light beam to the input interface 11. Herein, each one of the light emitting elements 121 is a light emitting diode (LED). In addition, the Mylar® polyester plate 13 has a plurality of luminous patterns 131, and the plurality of luminous patterns 131 are disposed on a lower surface 133 of the Mylar® polyester plate 13. Herein, the plurality of luminous patterns 131 are formed by printing a light transmissive black printing ink with a light shading rate about 98%, and the regions outside the plurality of luminous patterns 131 are formed by printing an opaque black printing ink, so as to form a plurality of light shading layers 132. Hence, the light can pass through the lower surface 133 of the Mylar® polyester plate 13 from where is printed with the plurality of luminous patterns 131 only, but is unable to pass through from the other regions of the lower surface 133 outside the plurality of luminous patterns 131. When the luminous module 12 of the luminous input device 1 is turned off, there is still faint light entering into the luminous input device 1 from the environment. However, the light quantity of the 2% faint light coming from the environment and passing through the regions printed with the plurality of luminous patterns 131 is too weak to be distinguished from the light quantity of the light coming from the environment by the user via his eyes due to the light shading rate of the luminous patterns 131 in the region is about 98%. As a result, the plurality of luminous patterns 131 on the Mylar® polyester plate 13 are unable to be displayed, i.e. are unable to be seen by the user. In contrast, when the luminous module 12 of the luminous input device 1 is turned on, there is a significant amount of light beams entering into the luminous input device 1. In such an instance, a difference between the light quantities of the light passing through the regions printed with the plurality of luminous patterns 131 and the light coming from the environment is enough to be distinguished by human eyes although there is only 2% of the light coming from the environment passing through the Mylar® polyester plate 13. As a result, the user can recognize the inputting locations indicated by the plurality of luminous patterns 131 on the luminous input device 1 due to the plurality of luminous patterns 131 are observable. The above mentioned descriptions are the structure and the function of a kind of the conventional touch input devices.

However, with the development of technology, the functions of the touch input devices become more abundant, and a kind of the commercially available input devices with multi luminous pattern layers is already introduced. FIG. 2 illustrates a structural schematic side view of a conventional input device with multi luminous pattern layers. Referring to FIG. 2, the input device 2 with multi luminous pattern layers comprises an input interface 21, a plurality of first luminous modules 22, a plurality of second luminous modules 23, a plurality of circuit boards 24, a plurality of light shading plate 25 and a protective layer 26. Herein, a bottom-up arranging sequence thereof is the input interface 21, the second luminous modules 23, the light shading plate 25, the first luminous modules 22 and the protective layer 26. Each one of the first luminous modules 22 includes two first light emitting elements 221 and a first light guiding plate 222. Herein, each one of the first light emitting elements 221 is capable of generating a first light beam (not shown), while the first light guiding plate 222 is arranged between the two first light emitting elements 221 and capable of guiding the first light beams, such that the first light beams are projected to the input interface 21. In addition, the first light guiding plate 222 has a plurality of first luminous patterns 2221, which are disposed to a lower surface 2222 of the first light guiding plate 222. In another word, when the first light emitting elements 221 generate the first light beams, the first luminous patterns 2221 are displayed on the first light guiding plate 222, wherein the plurality of first luminous patterns 2221 form as an Alphanumeric keyboard interface capable of being used to input letters of the alphabet and numbers.

Furthermore, each one of the second luminous modules 23 includes two second light emitting elements 231 and a second light guiding plate 232. Herein, each one of the second light emitting elements 231 is capable of generating a second light beam (not shown), while the second light guiding plate 232 is arranged between the two second light emitting elements 231 and capable of guiding the second light beams, such that the second light beams are projected to the input interface 21. In addition, the second light guiding plate 232 has a plurality of second luminous patterns 2321, which are disposed to a lower surface 2322 of the second light guiding plate 222. In another word, when the second light emitting elements 231 generate the second light beams, the second luminous patterns 2321 are displayed on the second light guiding plate 232, wherein the plurality of second luminous patterns 2321 form as a Chinese keyboard interface capable of being used to input Chinese characters. Moreover, all of the first light emitting elements 221 and the second light emitting elements 231 are LEDs.

As illustrated in FIG. 2, the protective layer 26 is disposed over the first luminous modules 22, and the protective layer 26 is capable of protecting the first luminous modules 22 against the collision or the friction provided by an external force. The protective layer 26 has a light shading layer 261, and the light shading layer 261 is disposed to an upper surface 262 of the protective layer 26. In addition, the light shading layer 261 is capable of shading most of the first light beams, most of the second light beams or the external light, wherein the light shading layer 261 is formed by using a light shading printing ink to print on the upper surface 262 of the protective layer 26, and a predetermined light shading rate of the light shading layer 261 is about 98%. Moreover, each one of the circuit board 24 is disposed at a side of the first luminous modules 22 and the second luminous modules 23 and perpendicular to the light shading plate 25. Furthermore, the first light emitting elements 221 and the second light emitting elements 231 are disposed on the circuit boards 24, wherein the circuit boards 24 correspond to each other. Further, according to FIG. 2, it can be understood that all of the first light emitting elements 221 and the second light emitting elements 231 are direct LEDs.

Besides, each one of the light shading plates 25 is disposed between one of the first light guiding plate 222 and the corresponding one of the second light guiding plate 232 and capable of shading the first light beams generated by the first light emitting elements 221. As a result, it is able to prevent the first light beams from being projected to the second light guide plate 232 and thus affecting the second luminous patterns 2321 of the second luminous modules 23 being displayed on the second light guiding plate 232. Similarly, the light shading plates 25 are capable of shading the second light beams generated by the second light emitting elements 231 as well. As a result, it is able to prevent the second light beams from being projected to the first light guide plate 222 and thus affecting the first luminous patterns 2221 of the first luminous modules 22 being displayed on the first light guiding plate 222.

When all of the first luminous modules 22 and the second luminous modules 23 of the input device 2 with multi luminous pattern layers are turned off, there is still faint light entering into the input device 2 with multi luminous pattern layers from the environment. However, the light quantity of the 2% faint light coming from the environment and passing through the light shading layer 261 is too weak to be distinguished from the light quantity of the light coming from the environment by the user via his eyes due to the predetermined light shading rate of the light shading layer 261 is about 98%. As a result, the plurality of first luminous patterns 2221 on the first light guiding plate 222 and the plurality of second luminous patterns 2321 on the second light guiding plate 232 are unable to be displayed, i.e. are unable to be seen by the user. In contrast, when the first luminous modules 22 of the input device 2 with multi luminous pattern layers is turned on, there is a significant amount of light beams entering into the input device 2 with multi luminous pattern layers. In such an instance, a difference between the light quantities of the light passing through the light shading layer 261 and the light coming from the environment is enough to be distinguished by human eyes although there is only 2% of the light coming from the environment passing through the light shading layer 261. As a result, the user can recognize the inputting locations indicated by the first luminous patterns 2221 on the input device 2 with multi luminous pattern layers due to the plurality of first luminous patterns 2221 are observable. In addition, the operation case for turning on the second luminous modules 23 of the input device 2 with multi luminous pattern layers is substantially the same as the operation case for turning on the first luminous modules 22 of the input device 2 with multi luminous pattern layers and thus is omitted herein.

As a result, it is understood that the conventional input device 2 with multi pattern layers may provide two kinds of luminous patterns, such that the user knows which input mode of the conventional input device 2 with multi pattern layers may be used currently according to which one of the first luminous pattern 2221 and the second luminous pattern 2321 is displayed. However, in the conventional input device 2 with multi pattern layers, a structural thickness thereof is too thick due to the circuit board 24 is perpendicular to the first light guiding plate 222.

SUMMARY OF THE INVENTION

The present invention is directed to a display device and an input device with multi luminous pattern layers capable of being manufactured with a smaller volume.

The present invention is further directed to a display device and an input device with multi luminous pattern layers capable of being manufactured with a lower cost.

In a preferred embodiment, the present invention provides a display device with multi luminous pattern layers comprising:
- a first light guiding plate, having a plurality of first luminous patterns;
- a second light guiding plate, disposed under the first light guiding plate, and the second light guiding plate having a plurality of second luminous patterns; wherein a first space is formed between a first end of the second light guiding plate and a first side of the first light guiding plate, and a second space is formed between a second side of the second light guiding plate and a second end of the first light guiding plate;
- at least one first light emitting element, located at the first side of the first light guiding plate and capable of generating at least one first light beam, such that the at least one first light beam is projected to the first light guiding plate, so as to display the plurality of first luminous patterns;
- at least one second light emitting element, located at the second side of the second light guiding plate and capable of generating at least one second light beam, such that the at least one second light beam is projected to the second light guiding plate, so as to display the plurality of second luminous patterns;

a first circuit board, located at the first side of the first light guiding plate and inserted into the first space, such that the at least one first light beam is blocked by the first circuit board and thus not projected to the second light guiding plate; and a second circuit board, located at the second side of the second light guiding plate and inserted into the second space, such that the at least one second light beam is blocked by the second circuit board and thus not projected to the first light guiding plate.

In a preferred embodiment, the display device with multi luminous pattern layers of the present invention further comprises a protective layer disposed on the first light guiding plate and capable of protecting the first light guiding plate, and the protective layer comprises a light shading region and a light transmissive region, the light shading region surrounds the light transmissive region, and the light shading region is capable of shading the at least one first light beam or the at least one second light beam; while the light transmissive region is capable of displaying the plurality of first luminous patterns or the plurality of second luminous patterns due to the at least one first light beam or the at least one second light beam, and the light transmissive region has a predetermined light shading rate; wherein the plurality of first luminous patterns or the plurality of second luminous patterns are not displayed by the first light guiding plate or the second light guiding plate due to the predetermined light shading rate when the at least one first light beam or the at least one second light beam is not generated.

In a preferred embodiment, at least one extraneous light coming from outside of the display device is shaded by the light transmissive region with the predetermined light shading rate when the at least one first light beam or the at least one second light beam is not generated, such that the plurality of first luminous patterns or the plurality of second luminous patterns are not displayed, and the predetermined light shading rate is ranged between 75% and 80%.

In a preferred embodiment, both of the at least one first light emitting element and the at least one second light emitting element are Side-View LEDs, and both of the first circuit board and the second circuit board are parallel to the first light guiding plate and the second light guiding plate.

In a preferred embodiment, the plurality of first luminous patterns are disposed on an upper surface or a lower surface of the first light guiding plate, while the plurality of second luminous patterns are disposed on an upper surface or a lower surface of the second light guiding plate, and each one of at least one first luminous pattern of the plurality of first luminous patterns and at least one second luminous pattern of the plurality of second luminous patterns is formed from a plurality of micro structures of light guide arranged densely.

In a preferred embodiment, the first circuit board further comprises a first white glossy solder resist ink capable of reflecting the at least one first light beam, while the second circuit board further comprises a second white glossy solder resist ink capable of reflecting the at least one second light beam, and the first white glossy solder resist ink is formed on a first surface of the first circuit board by printing technology, while the second white glossy solder resist ink is formed on a second surface of the second circuit board by printing technology.

In a preferred embodiment, the present invention further provides an input device with multi luminous pattern layers comprising:

a first light guiding plate, having a plurality of first luminous patterns;

a second light guiding plate, disposed under the first light guiding plate, and the second light guiding plate having a plurality of second luminous patterns; wherein a first space is formed between a first end of the second light guiding plate and a first side of the first light guiding plate, and a second space is formed between a second side of the second light guiding plate and a second end of the first light guiding plate;

at least one first light emitting element, located at the first side of the first light guiding plate and capable of generating at least one first light beam, such that the at least one first light beam is projected to the first light guiding plate, so as to display the plurality of first luminous patterns;

at least one second light emitting element, located at the second side of the second light guiding plate and capable of generating at least one second light beam, such that the at least one second light beam is projected to the second light guiding plate, so as to display the plurality of second luminous patterns;

a first circuit board, located at the first side of the first light guiding plate and inserted into the first space, such that the at least one first light beam is blocked by the first circuit board and thus not projected to the second light guiding plate;

a second circuit board, located at the second side of the second light guiding plate and inserted into the second space, such that the at least one second light beam is blocked by the second circuit board and thus not projected to the first light guiding plate; and an input interface, stacked with the first light guiding plate or the second light guiding plate and capable of being touched, so as to generate a touch signal.

In a preferred embodiment, the input device with multi luminous pattern layers of the present invention further comprises a protective layer disposed on the input interface or the first light guiding plate and capable of protecting the input interface or the first light guiding plate, and the protective layer comprises a light shading region and a light transmissive region, the light shading region surrounds the light transmissive region, and the light shading region is capable of shading the at least one first light beam or the at least one second light beam; while the light transmissive region is capable of displaying the plurality of first luminous patterns or the plurality of second luminous patterns due to the at least one first light beam or the at least one second light beam, and the light transmissive region has a predetermined light shading rate; wherein the plurality of first luminous patterns or the plurality of second luminous patterns are not displayed by the first light guiding plate or the second light guiding plate due to the predetermined light shading rate when the at least one first light beam or the at least one second light beam is not generated.

In a preferred embodiment, at least one extraneous light coming from outside of the input device is shaded by the light transmissive region with the predetermined light shading rate when the at least one first light beam or the at least one second light beam is not generated, such that the plurality of first luminous patterns or the plurality of second luminous patterns are not displayed, and the predetermined light shading rate is ranged between 75% and 80%.

In a preferred embodiment, both of the at least one first light emitting element and the at least one second light emitting element are Side-View LEDs, and both of the first circuit board and the second circuit board are parallel to the first light guiding plate and the second light guiding plate.

In a preferred embodiment, the plurality of first luminous patterns are disposed on an upper surface or a lower surface of the first light guiding plate, while the plurality of second luminous patterns are disposed on an upper surface or a lower surface of the second light guiding plate, and each one of at least one first luminous pattern of the plurality of first luminous patterns and at least one second luminous pattern of the plurality of second luminous patterns is formed from a plurality of micro structures of light guide arranged densely.

In a preferred embodiment, the first circuit board further comprises a first white glossy solder resist ink capable of reflecting the at least one first light beam, while the second circuit board further comprises a second white glossy solder resist ink capable of reflecting the at least one second light beam, and the first white glossy solder resist ink is formed on a first surface of the first circuit board by printing technology, while the second white glossy solder resist ink is formed on a second surface of the second circuit board by printing technology.

In a preferred embodiment, the input interface is disposed under the first light guiding plate, and the input interface is an opaque printed circuit board (PCB) capacitive touch sensor.

In a preferred embodiment, the input interface is disposed over the first light guiding plate, and the input interface is a light transmissive resistance touch sensor, a light transmissive surface capacitive touch sensor, a light transmissive inner capacitive touch sensor or a light transmissive projected capacitive touch sensor.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
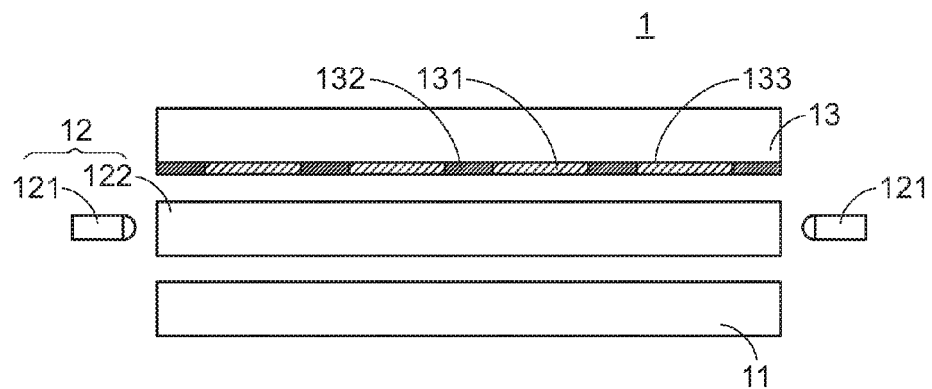
FIG. 1 illustrates a structural schematic side view of a conventional luminous input device.
Figure 2:
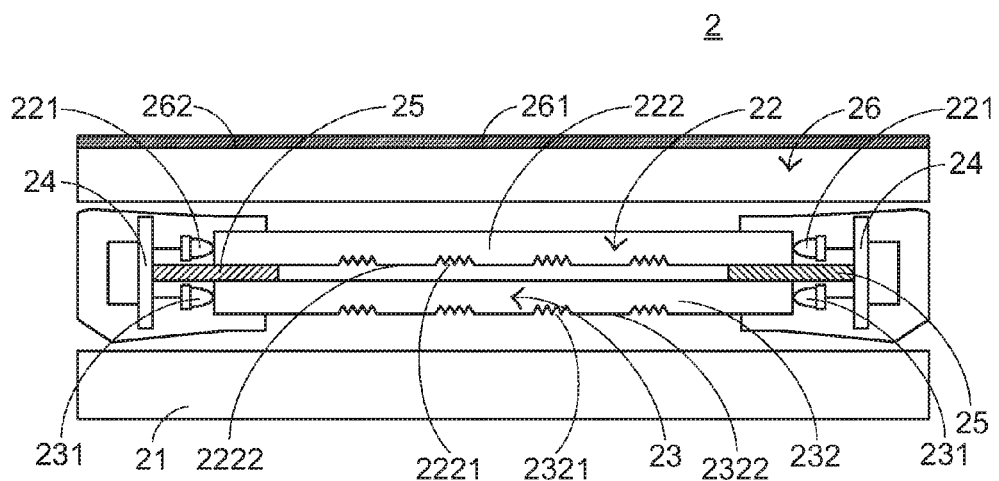
FIG. 2 illustrates a structural schematic side view of a conventional input device with multi luminous pattern layers.
Figure 3:
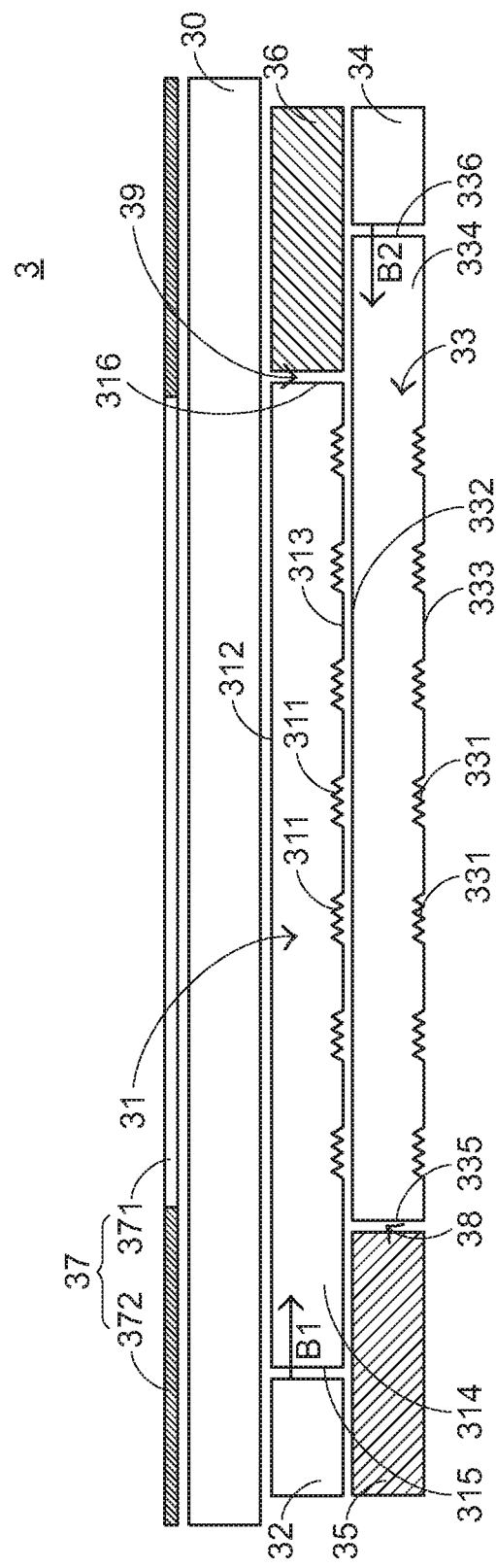
FIG. 3 illustrates a structural schematic side view of an input device with multi luminous pattern layers according to a first preferred embodiment of the present invention.

In view of the defects of the conventional arts, the present invention provides an input device with multi luminous pattern layers. FIG. 3 illustrates a structural schematic side view of an input device with multi luminous pattern layers according to a first preferred embodiment of the present invention. Referring to FIG. 3, the input device 3 with multi luminous pattern layers comprises an input interface 30, a first light guiding plate 31, at least one first light emitting element 32, a second light guiding plate 33, at least one second light emitting element 34, a first circuit board 35, a second circuit board 36 and a protective layer 37. Herein, a bottom-up arranging sequence thereof is the first circuit board 35 (and the second light guiding plate 33 and the second light emitting element 34), the first light guiding plate 31 (and the first light emitting element 32 and the second circuit board 36), the input interface 30 and the protective layer 36. Further, the first light emitting element 32 is located at a first side 314 of the first light guiding plate 31 (i.e. the left side in FIG. 3), while the second light emitting element 34 is located at a second side 334 of the second light guiding plate 33 (i.e. the right side in FIG. 3).

As illustrated in FIG. 3, the first light guiding plate 31 has a plurality of first luminous patterns 311, wherein the first luminous patterns 311 can be disposed on an upper surface 312 or a lower surface 313 of the first light guiding plate 31. In addition, the at least one first light emitting element 32 is disposed to the first side 314 of the first light guiding plate 31, adjacent to a first end 315 of the first light guiding plate 31 and capable of generating at least one first light beam B1, such that the at least one first light beam B1 is projected to the first light guiding plate 31, so as to display the plurality of first luminous patterns 311. In contrast, the second light guiding plate 33 is disposed under the first light guiding plate 31, and the second light guiding plate 33 has a plurality of second luminous patterns 331, wherein the second luminous patterns 331 are disposed on an upper surface 332 or a lower surface 333 of the second light guiding plate 33. Herein, a first space 38 is formed between a first end 335 of the second light guiding plate 33 and the first side 314 of the first light guiding plate 31, and a second space 39 is formed between a second side 334 of the second light guiding plate 33 and a second end 316 of the first light guiding plate 31. In addition, the at least one second light emitting element 34 is located at the second side 334 of the second light guiding plate 33, adjacent to a second end 336 of the second light guiding plate 33 and capable of generating at least one second light beam B2, such that the at least one second light beam B2 is projected to the second light guiding plate 33, so as to display the plurality of second luminous patterns 331. In another word, the first luminous patterns 311 on the first light guiding plate 31 are displayed when the first light emitting element 32 generates the first light beam B1, while the second luminous patterns 331 on the second light guiding plate 33 are displayed when the second light emitting element 34 generates the second light beam B2.

In the present preferred embodiment, the plurality of first luminous patterns 311 are disposed on the lower surface 313 of the first light guiding plate 31, while the plurality of second luminous patterns 331 are disposed on the lower surface 333 of the second light guiding plate 33. However, in the other preferred embodiments, the plurality of first luminous patterns can be disposed on the upper surface of the first light guiding plate. Similarly, the plurality of second luminous patterns can be disposed on the upper surface of the second light guiding plate.

In the first light guiding plate 31 and the second light guiding plate 33, each one of the first luminous pattern 311 and the second luminous pattern 331 is formed from a plurality of micro structures of light guide arranged densely, and each one of the plurality of micro structures of light guide can be a plurality of micro structures (such as micro lenses, v-cuts, etc.) arranged densely or a plurality of mesh points arranged densely. The plurality of micro structures of light guide for forming the first luminous patterns 311 and the second luminous patterns 331 are used for varying incident angles of a partial light inside the first light guiding plate 31 or the second light guiding plate 33. As a result, the partial light can be refracted to pass through the first light guiding plate 31 or the second light guiding plate 33 due to the total reflection paths of the partial light are changed, such that the partial light reveals from the top side of the plurality of micro structures of light guide, so as to present the first luminous patterns 311 or the second luminous patterns 331.

In addition, the input interface 30 is stacked with the first light guiding plate 31, located over the first light guiding plate 31, and capable of being activated by a user with his finger or a stylus, so as to correspondingly generate at least one touch signal. In the present preferred embodiment, the input interface 30 can use a light transmissive resistive touch sensor, in other preferred embodiments, however, the input interface can use a light transmissive surface capacitive touch sensor, a light transmissive inner capacitive touch sensor or a light transmissive projected capacitive touch sensor as well.

Figure 5:
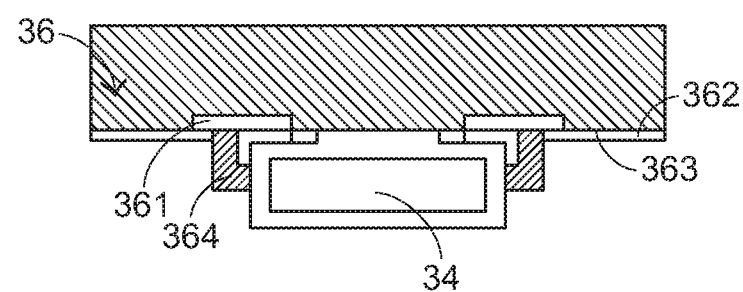
FIG. 5 illustrates a structural schematic view from another angle of view of a second light emitting element of an input device with multi luminous pattern layers disposed on a second circuit board according to a first preferred embodiment of the present invention.

As illustrated in FIG. 3, the protective layer 37 is disposed over the input interface 30, and the protective layer 37 is capable of protecting the input interface 30. Moreover, the protective layer 37 comprises a light transmissive region 371 and a light shading region 372, wherein the light shading region 372 surrounds the light transmissive region 371 (as illustrated in FIG. 5), and the light shading region 372 is capable of shading the first light beam B1, the second light beam B2 or an external light coming from the ambient environment. Besides, the light transmissive region 371 is capable of displaying the first luminous patterns 311 or the second luminous patterns 331 due to the first light beam B1 or the second light beam B2, and the light transmissive region 371 has a predetermined light shading rate, wherein the predetermined light shading rate is ranged between 75% and 80%.

Figure 4:
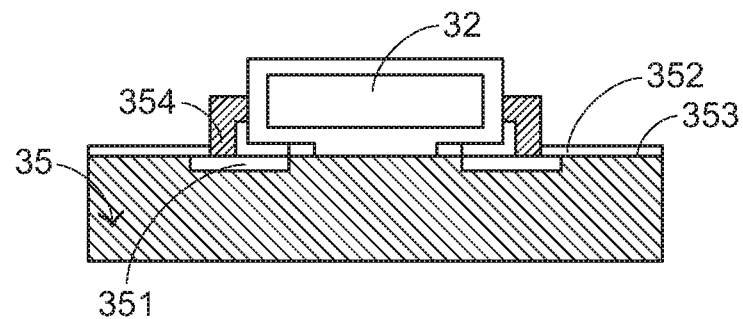
FIG. 4 illustrates a structural schematic view from another angle of view of a first light emitting element of an input device with multi luminous pattern layers disposed on a first circuit board according to a first preferred embodiment of the present invention.

Next, an arrangement of the at least one first light emitting element 32 is illustrated hereinafter. FIG. 4 illustrates a structural schematic view from another angle of view of a first light emitting element of an input device with multi luminous pattern layers disposed on a first circuit board according to a first preferred embodiment of the present invention. Referring to FIG. 3 and FIG. 4 together, the first circuit board 35 is located at the first side 314 of the first light guiding plate 31 and inserting into the first space 38. In addition, the first circuit board 35 has a first metal contact 351 and a first white glossy solder resist ink 352, wherein the first metal contact 351 is disposed on a first surface 353 of the first circuit board 35, and the first white glossy solder resist ink 352 is capable of reflecting the at least one first light beam B1. Herein, the first white glossy solder resist ink 352 can be formed on the first surface 353 of the first circuit board 35 by printing technology. Moreover, the at least one first light emitting element 32 is disposed on the first surface 353 of the first circuit board 35. Besides, the at least one first light emitting element 32 is mounted on the first metal contact 351 located on the first surface 353 of the first circuit board 35 by a welding process with a first welding element 354. Therefore, the at least one first light beam B1 correspondingly generated by the at least one first light emitting element 32 is blocked by the first circuit board 35 inserted into the first space 38 and thus not being projected into the second light guiding plate 33. As a result, it is able to prevent a display result of the plurality of first luminous patterns 311 on the first light guiding plate 31 from being interfered due to the plurality of second luminous patterns 331 on the second light guiding plate 33 being presented. In the present preferred embodiment, the at least one first light emitting element 32 is a Side-View LED (or named lateral LED), the first circuit board 35 is parallel to the first light guiding plate 31 and the second light guiding plate 33, and the first welding element 354 thereof is made of Tin metal.

Similarly, an arrangement of the at least one second light emitting element 34 is illustrated hereinafter. FIG. 5 illustrates a structural schematic view from another angle of view of a second light emitting element of an input device with multi luminous pattern layers disposed on a second circuit board according to a first preferred embodiment of the present invention. Referring to FIG. 3 and FIG. 5 together, the second circuit board 36 is located at the second side 334 of the second light guiding plate 33 and inserting into the second space 39. In addition, the second circuit board 36 has a second metal contact 361 and a second white glossy solder resist ink 362, wherein the second metal contact 361 is disposed on a second surface 363 of the second circuit board 36, and the second white glossy solder resist ink 362 is capable of reflecting the at least one second light beam B2. Herein, the second white glossy solder resist ink 362 can be formed on the second surface 363 of the second circuit board 36 by printing technology. Moreover, the at least one second light emitting element 34 is disposed on the second surface 363 of the second circuit board 36. Besides, the at least one second light emitting element 34 is mounted on the second metal contact 361 located on the second surface 363 of the second circuit board 36 by a welding process with a second welding element 364. Therefore, the at least one second light beam B2 correspondingly generated by the at least one second light emitting element 34 is blocked by the second circuit board 36 inserted into the second space 39 and thus not being projected into the first light guiding plate 31. As a result, it is able to prevent a display result of the plurality of second luminous patterns 331 on the second light guiding plate 33 from being interfered due to the plurality of first luminous patterns 311 on the first light guiding plate 31 being presented. In the present preferred embodiment, the at least one second light emitting element 34 is a Side-View LED (or named lateral LED) as well, the second circuit board 36 is parallel to the first light guiding plate 31 and the second light guiding plate 33 as well, and the second welding element 364 thereof is made of Tin metal.

In the input device 3 with multi luminous pattern layers, when both of the first light emitting element 32 and the second light emitting element 34 thereof are inactivated and thus both of the first light beam B1 and the second light beam B2 are not generated, neither the plurality of first luminous patterns 311 nor the plurality of second luminous patterns 331 are displayed due to the predetermined light shading rate of the light transmissive region 371. It is resulted from that only the faint external light coming from the ambient environment is able to be transmitted into the light transmissive region 371 of the protective layer 37 when the first light emitting element 32 does not generate the first light beam B1 and the second light emitting element 34 does not generate the second light beam B2, and the predetermined light shading rate of the light transmissive region 371 is ranged between 75% and 80%. As a result, about 75% to 80% of the faint light transmitted into the light transmissive region 371 is absorbed by the light transmissive region 371, while the remaining light about 20% to 25% of the faint light passes through the input interface 30 and then is incident to the first light guiding plate 31. When the remaining faint light about 20% to 25% of the faint light arrives the micro structures of light guide on the lower surface 313 of the first light guiding plate 31, there is about half of the remaining faint light refracted and then transmitted towards a lower side of the first light guiding plate 31 due to the remaining faint light transmitted in various directions is incident to the micro structures of light guide with different incident angles. Hence, there is only about 10% of the faint light being reflected towards the input interface 30. Next, some of the 10% faint light is further absorbed by the light transmissive region 371 during the 10% faint light is reflected, such that there merely remains about 2% of the faint light reveals from the light transmissive region 371. As a result, neither the first luminous pattern 311 nor the second luminous pattern 331 can be displayed, i.e. the user can not see both of the first luminous pattern 311 and the second luminous pattern 331.

Figure 6:
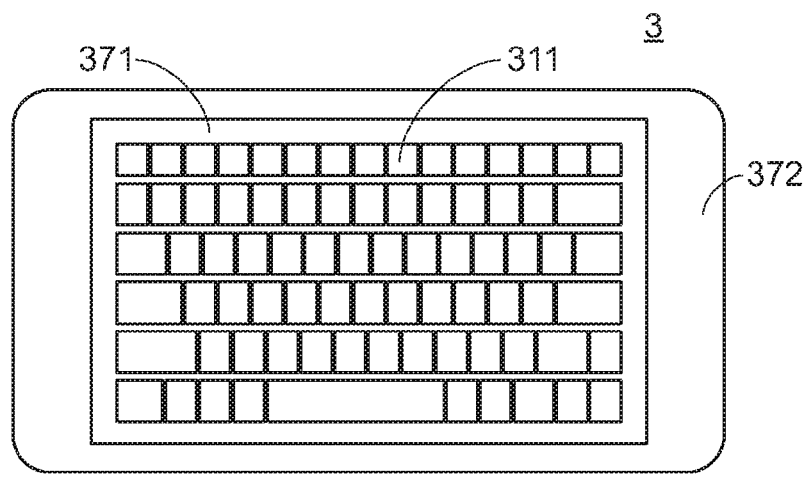
FIG. 6 illustrates a structural schematic top view of an input device with multi luminous pattern layers in a first operation mode according to a first preferred embodiment of the present invention.

FIG. 6 illustrates a structural schematic top view of an input device with multi luminous pattern layers in a first operation mode according to a first preferred embodiment of the present invention. Referring to FIG. 3 and FIG. 6 together, when the first light emitting element 32 is activated and thus the first light beam B1 is generated, a significant amount of the first light beam B1 is transmitted into the first light guiding plate 31 from the first end 315 of the first light guiding plate 31. In contrast, part of the first light beam B1 is blocked and thus reflected by the first white glossy solder resist ink 352 on the first circuit board 35, such that the part of the first light beam B1 is transmitted into the first light guiding plate 31 from the first side 314 of the first light guiding plate 31. When the first light beam B1 transmitted into the first light guiding plate 31 is transmitted to the first luminous patterns 311 formed from the micro structures of light guide, the first light beam B1 is transmitted towards an upper side of the first light guiding plate 31 due to the total reflection path thereof is changed by the micro structures of light guide. After that, about 75% to 80% of the first light beam B1 is absorbed by the light transmissive region 371 when the first light beam B1 passes through the input interface 30 and is transmitted into the light transmissive region 371 of the protective layer 37. As a result, there is still about 20% to 25% of the first light beam B1 able to pass through the light transmissive region 371 and then to display the lighted first luminous patterns 311, and thus the user can see the lighted first luminous patterns 311 as illustrated in FIG. 6.

Figure 7:
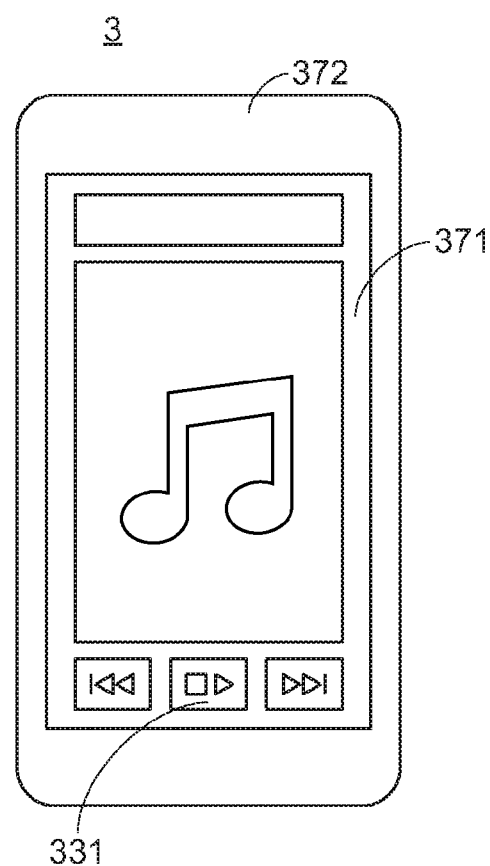
FIG. 7 illustrates a structural schematic top view of an input device with multi luminous pattern layers in a second operation mode according to a first preferred embodiment of the present invention.

FIG. 7 illustrates a structural schematic top view of an input device with multi luminous pattern layers in a second operation mode according to a first preferred embodiment of the present invention. Next, referring to FIG. 3 and FIG. 7 together, when the second light emitting element 34 is activated and thus the second light beam B2 is generated, a significant amount of the second light beam B2 is transmitted into the second light guiding plate 33 from the second end 336 of the second light guiding plate 33. In contrast, part of the second light beam B2 is blocked and thus reflected by the second white glossy solder resist ink 362 on the second circuit board 36, such that the part of the second light beam B2 is transmitted into the second light guiding plate 33 from the second side 334 of the second light guiding plate 33. When the second light beam B2 transmitted into the second light guiding plate 33 is transmitted to the second luminous patterns 331 formed from the micro structures of light guide, the second light beam B2 is transmitted towards an upper side of the second light guiding plate 33 due to the total reflection path thereof is changed by the micro structures of light guide. After that, about 75% to 80% of the second light beam B2 is absorbed by the light transmissive region 371 when the second light beam B2 passes through the input interface 30 and is transmitted into the light transmissive region 371 of the protective layer 37. As a result, there is still about 20% to 25% of the second light beam B2 able to pass through the light transmissive region 371 and then to display the lighted second luminous patterns 331, and thus the user can see the lighted second luminous patterns 331 as illustrated in FIG. 7. According to FIG. 6 and FIG. 7, it can be understood that the plurality of first luminous patterns 311 form as a keyboard interface capable of being used to input letters of the alphabet, symbols and numbers, and the plurality of second luminous patterns 331 form as a music player interface capable of being used to control the music playback.

Figure 8:
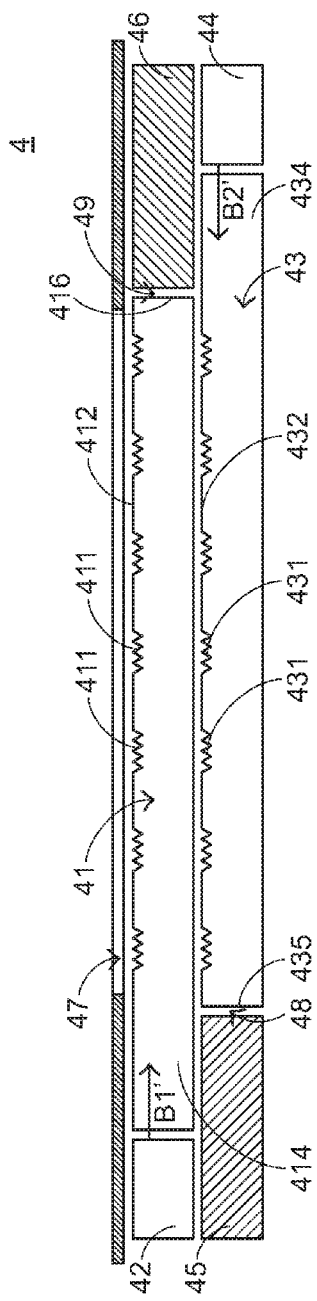
FIG. 8 illustrates a structural schematic side view of a display device with multi luminous pattern layers according to a second preferred embodiment of the present invention.

In addition, the present invention further provides a second preferred embodiment. FIG. 8 illustrates a structural schematic side view of a display device with multi luminous pattern layers according to a second preferred embodiment of the present invention. Referring to FIG. 8, the display device 4 with multi luminous pattern layers comprises a first light guiding plate 41, at least one first light emitting element 42, a second light guiding plate 43, at least one second light emitting element 44, a first circuit board 45, a second circuit board 46 and a protective layer 47. Herein, a bottom-up arranging sequence thereof is the first circuit board 45 (and the second light guiding plate 43 and the second light emitting element 44), the first light guiding plate 41 (and the first light emitting element 42 and the second circuit board 46) and the protective layer 47. The second light guiding plate 43 is disposed under the first light guiding plate 41, a first space 48 is formed between a first end 435 of the second light guiding plate 43 and a first side 414 of the first light guiding plate 41, and a second space 49 is formed between a second side 434 of the second light guiding plate 43 and a second end 416 of the first light guiding plate 41. Moreover, the first circuit board 45 is located at the first side 414 of the first light guiding plate 41 and inserting into the first space 48, such that at least one first light beam B1' correspondingly generated by the at least one first light emitting element 42 can be blocked by the first circuit board 45. Similarly, the second circuit board 46 is located at the second side 434 of the second light guiding plate 43 and inserting into the second space 49, such that at least one second light beam B2' correspondingly generated by the at least one second light emitting element 44 can be blocked by the second circuit board 46. It should be noted that the structure of the display device 4 with multi luminous pattern layers of the present preferred embodiment and the functions of each of the components thereof are substantially the same as those of the input device 3 with multi luminous pattern layers of the first preferred embodiment, and similarities therebetween are omitted herein.

Regarding to the display device 4 with multi luminous pattern layers of the present preferred embodiment, there are two differences from the input device 3 with multi luminous pattern layers of the first preferred embodiment. First, there is no input interface disposed in the display device 4 with multi luminous pattern layers of the present preferred embodiment. Second, the first light guiding plate 41 has a plurality of first luminous patterns 411, which are disposed on an upper surface 412 of the first light guiding plate 41, and the second light guiding plate 43 has a plurality of second luminous patterns 431, which are disposed on an upper surface 432 of the second light guiding plate 43.

Figure 9:
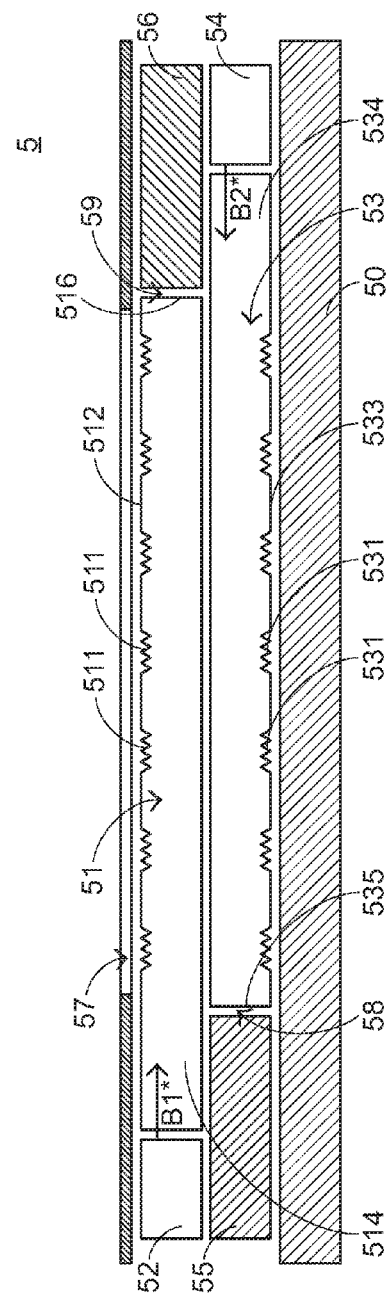
FIG. 9 illustrates a structural schematic side view of an input device with multi luminous pattern layers according to a third preferred embodiment of the present invention.

Furthermore, the present invention provides a third preferred embodiment as well, which illustrates an input device with multi luminous pattern layers. FIG. 9 illustrates a structural schematic side view of an input device with multi luminous pattern layers according to a third preferred embodiment of the present invention. Referring to FIG. 9, the input device 5 with multi luminous pattern layers comprises an input interface 50, a first light guiding plate 51, at least one first light emitting element 52, a second light guiding plate 53, at least one second light emitting element 54, a first circuit board 55, a second circuit board 56 and a protective layer 57. Herein, the first light guiding plate 51 has a plurality of first luminous patterns 511, while the second light guiding plate 53 has a plurality of second luminous patterns 531. In addition, a bottom-up arranging sequence thereof is the input interface 50, the first circuit board 55 (and the second light guiding plate 53 and the second light emitting element 54), the first light guiding plate 51 (and the first light emitting element 52 and the second circuit board 56) and the protective layer 57. The second light guiding plate 53 is disposed under the first light guiding plate 51, a first space 58 is formed between a first end 535 of the second light guiding plate 53 and a first side 514 of the first light guiding plate 51, and a second space 59 is formed between a second side 534 of the second light guiding plate 53 and a second end 516 of the first light guiding plate 51. Moreover, the first circuit board 55 is located at the first side 514 of the first light guiding plate 51 and inserting into the first space 58, such that at least one first light beam B1* correspondingly generated by the at least one first light emitting element 52 can be blocked by the first circuit board 55. Similarly, the second circuit board 56 is located at the second side 534 of the second light guiding plate 53 and inserting into the second space 59, such that at least one second light beam B2* correspondingly generated by the at least one second light emitting element 54 can be blocked by the second circuit board 56.

It should be noted that the structure of the input device 5 with multi luminous pattern layers of the present preferred embodiment and the functions of each of the components thereof are substantially the same as those of the input device 3 with multi luminous pattern layers of the first preferred embodiment, and similarities therebetween are omitted herein. However, regarding to the input device 5 with multi luminous pattern layers of the present preferred embodiment, there are two differences from the input device 3 with multi luminous pattern layers of the first preferred embodiment. First, the input interface 50 thereof is disposed under the second light guiding plate 53. In the present preferred embodiment, the input interface 50 is an opaque PCB capacitive touch sensor. Second, as illustrated in FIG. 9, the plurality of first luminous patterns 511 are disposed on an upper surface 512 of the first light guiding plate 51, while the plurality of second luminous patterns 531 are disposed on a lower surface 533 of the second light guiding plate 53.

According to the above mentioned preferred embodiments, it is understood that, in the input device with multi pattern layers and the display device with multi pattern layers, both of the first circuit board thereof and the second circuit board thereof are parallel to the first light guiding plate and the second light guiding plate. As a result, both of the input device with multi pattern layers and the display device with multi pattern layers are able to be practiced thinner and lighter due to the thicknesses thereof are able to be reduced. In addition, it is unnecessary to dispose any light shading element in the input device with multi pattern layers and the display device with multi pattern layers. Instead, the first light beam and the second light beam are respectively blocked by using the structures of directly inserting the first circuit board and the second circuit board into the first space and the second space. As a result, the total manufacturing costs of the input device with multi pattern layers and the display device with multi pattern layers are able to be reduced.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A display device with multi luminous pattern layers, comprising:
   a first light guiding plate, having a plurality of first luminous patterns;
   a second light guiding plate, disposed under the first light guiding plate, and the second light guiding plate having a plurality of second luminous patterns, wherein a first space is formed between a first end of the second light guiding plate and a first side of the first light guiding plate, and a second space is formed between a second side of the second light guiding plate and a second end of the first light guiding plate;
   at least one first light emitting element, located at the first side of the first light guiding plate and capable of generating at least one first light beam, such that the at least one first light beam is projected to the first light guiding plate, so as to display the plurality of first luminous patterns;
   at least one second light emitting element, located at the second side of the second light guiding plate and capable of generating at least one second light beam, such that the at least one second light beam is projected to the second light guiding plate, so as to display the plurality of second luminous patterns;
   a first circuit board, located at the first side of the first light guiding plate and inserted into the first space, such that the first circuit board blocks the at least one first light beam from being projected to the second light guiding plate; and
   a second circuit board, located at the second side of the second light guiding plate and inserted into the second space, such that the second circuit board blocks the at least one second light beam from being projected to the first light guiding plate.

2. The display device with multi luminous pattern layers as claimed in claim 1, further comprising a protective layer disposed on the first light guiding plate and capable of protecting the first light guiding plate, and the protective layer comprising a light shading region and a light transmissive region, the light shading region surrounding the light transmissive region, and the light shading region capable of shading the at least one first light beam or the at least one second light beam, while the light transmissive region capable of displaying the plurality of first luminous patterns or the plurality of second luminous patterns displayed by the at least one first light beam or the at least one second light beam, and the light transmissive region having a predetermined light shading rate, wherein the plurality of first luminous patterns or the plurality of second luminous patterns are not displayed by the first light guiding plate or the second light guiding plate due to the predetermined light shading rate when the at least one first light beam or the at least one second light beam is not generated.

3. The display device with multi luminous pattern layers as claimed in claim 2, wherein at least one extraneous light coming from outside of the display device is shaded by the light transmissive region with the predetermined light shading rate when the at least one first light beam or the at least one second light beam is not generated, such that the plurality of first luminous patterns or the plurality of second luminous patterns are not displayed, and the predetermined light shading rate is ranged between 75% and 80%.

4. The display device with multi luminous pattern layers as claimed in claim 1, wherein both of the at least one first light emitting element and the at least one second light emitting element are Side-View LEDs, and both of the first circuit board and the second circuit board are parallel to the first light guiding plate and the second light guiding plate.

5. The display device with multi luminous pattern layers as claimed in claim 1, wherein the plurality of first luminous patterns are disposed on an upper surface or a lower surface of the first light guiding plate, while the plurality of second luminous patterns are disposed on an upper surface or a lower surface of the second light guiding plate, and each one of at least one first luminous pattern of the plurality of first luminous patterns and at least one second luminous pattern of the plurality of second luminous patterns is formed from a plurality of micro structures on each respective light guiding plate.

6. The display device with multi luminous pattern layers as claimed in claim 1, wherein the first circuit board further comprises a first white glossy solder resist ink capable of reflecting the at least one first light beam, while the second circuit board further comprises a second white glossy solder resist ink capable of reflecting the at least one second light beam, and the first white glossy solder resist ink is formed on a first surface of the first circuit board by printing technology, while the second white glossy solder resist ink is formed on a second surface of the second circuit board by printing technology.

7. An input device with multi pattern layers, comprising:
   a first light guiding plate, having a plurality of first luminous patterns;
   a second light guiding plate, disposed under the first light guiding plate, and the second light guiding plate having a plurality of second luminous patterns, wherein a first space is formed between a first end of the second light guiding plate and a first side of the first light guiding plate, and a second space is formed between a second side of the second light guiding plate and a second end of the first light guiding plate;
   at least one first light emitting element, located at the first side of the first light guiding plate and capable of generating at least one first light beam, such that the at least one first light beam is projected to the first light guiding plate, so as to display the plurality of first luminous patterns;
   at least one second light emitting element, located at the second side of the second light guiding plate and capable of generating at least one second light beam, such that the at least one second light beam is projected to the second light guiding plate, so as to display the plurality of second luminous patterns;
   a first circuit board, located at the first side of the first light guiding plate and inserted into the first space, such that the first circuit board blocks the at least one first light beam from being projected to the second light guiding plate;
   a second circuit board, located at the second side of the second light guiding plate and inserted into the second space, such that the second circuit board blocks the at least one second light beam from being projected to the first light guiding plate; and
   an input interface, stacked with the first light guiding plate or the second light guiding plate and capable of being touched, so as to generate a touch signal.

8. The input device with multi luminous pattern layers as claimed in claim 7, further comprising a protective layer disposed on the input interface or the first light guiding plate and capable of protecting the input interface or the first light guiding plate, and the protective layer comprising a light shading region and a light transmissive region, the light shading region surrounding the light transmissive region, and the light shading region capable of shading the at least one first light beam or the at least one second light beam, while the light transmissive region capable of displaying the plurality of first luminous patterns or the plurality of second luminous patterns due to the at least one first light beam or the at least one second light beam, and the light transmissive region having a predetermined light shading rate, wherein the plurality of first luminous patterns or the plurality of second luminous patterns are not displayed by the first light guiding plate or the second light guiding plate due to the predetermined light shading rate when the at least one first light beam or the at least one second light beam is not generated.

9. The input device with multi luminous pattern layers as claimed in claim 8, wherein at least one extraneous light coming from outside of the input device is shaded by the light transmissive region with the predetermined light shading rate when the at least one first light beam or the at least one second light beam is not generated, such that the plurality of first luminous patterns or the plurality of second luminous patterns are not displayed, and the predetermined light shading rate is ranged between 75% and 80%.

10. The input device with multi luminous pattern layers as claimed in claim 7, wherein both of the at least one first light emitting element and the at least one second light emitting element are Side-View LEDs, and both of the first circuit board and the second circuit board are parallel to the first light guiding plate and the second light guiding plate.

11. The input device with multi luminous pattern layers as claimed in claim 7, wherein the plurality of first luminous patterns are disposed on an upper surface or a lower surface of the first light guiding plate, while the plurality of second luminous patterns are disposed on an upper surface or a lower surface of the second light guiding plate, and each one of at least one first luminous pattern of the plurality of first luminous patterns and at least one second luminous pattern of the plurality of second luminous patterns is formed from a plurality of micro structures on each respective light guiding plate.

12. The input device with multi luminous pattern layers as claimed in claim 7, wherein the first circuit board further comprises a first white glossy solder resist ink capable of reflecting the at least one first light beam, while the second circuit board further comprises a second white glossy solder resist ink capable of reflecting the at least one second light beam, and the first white glossy solder resist ink is formed on a first surface of the first circuit board by printing technology, while the second white glossy solder resist ink is formed on a second surface of the second circuit board by printing technology.

13. The input device with multi luminous pattern layers as claimed in claim 7, wherein the input interface is disposed under the first light guiding plate, and the input interface is an opaque PCB capacitive touch sensor.

14. The input device with multi luminous pattern layers as claimed in claim 7, wherein the input interface is disposed over the first light guiding plate, and the input interface is a light transmissive resistance touch sensor, a light transmissive surface capacitive touch sensor, a light transmissive inner capacitive touch sensor or a light transmissive projected capacitive touch sensor.

* * * * *